United States Patent [19]
Conner et al.

[11] Patent Number: 5,186,678
[45] Date of Patent: Feb. 16, 1993

[54] HEART AND LIVER HARVESTING SYSTEM

[75] Inventors: James S. Ellis; Julius A. Ellis, both of Gainesville, Ga.

[73] Assignee: Ronnie M. Conner Dahlonega, Tommy N. Hulsey, Gainesville, James S. Ellis, Gainesville, Julius A. Ellis, Gainesville, Jimmie C. Hewell, Gainesville, all of Ga.

[21] Appl. No.: 561,730

[22] Filed: Aug. 1, 1990

[51] Int. Cl.$^5$ .............................................. A22C 11/00
[52] U.S. Cl. .................................... 452/106; 452/111; 452/115
[58] Field of Search ............... 452/106, 111, 112, 109, 452/120, 123, 115, 107, 117

[56] References Cited

U.S. PATENT DOCUMENTS

| | | | |
|---|---|---|---|
| Re. 32,402 | 4/1987 | Graham et al. | 452/117 |
| 2,830,319 | 4/1958 | Muntz | 452/115 |
| 3,927,440 | 12/1975 | Sindler et al. | 452/107 |
| 4,951,352 | 8/1990 | Harben, III; et al. | 452/106 |
| 4,965,908 | 10/1990 | Meyn | 452/106 |

Primary Examiner—Willis Little
Attorney, Agent, or Firm—B. J. Powell

[57] ABSTRACT

Method and apparatus for mechanically and individually removing the heart and liver from poultry viscera still attached to the poultry carcass being transported through the poultry plant by an overhead conveyor and cleaning the heart after removal.

15 Claims, 17 Drawing Sheets

HEART AND LIVER HARVESTING SYSTEM

BACKGROUND OF THE INVENTION

In the processing of poultry, the usable parts (heart, liver and sometimes lungs) of the vascular system must be removed from the viscera and appropriately cleaned before being used. Typically, only the heart and liver are considered suitable for human consumption. In the past, the separation of the edible vascular parts has been primarily a manual operation which was performed after the viscera was mechanically removed from the interior of the poultry carcass but still attached to the carcass and before the mechanical gizzard processing operation. Thus, there is a need to mechanically process the vascular package still attached to the viscera after the mechanical eviscerating operation.

SUMMARY OF THE INVENTION

These and other problems associated with the prior art giblet processing techniques are overcome in the invention disclosed herein by providing a method and apparatus for mechanically removing the vascular package from the viscera and for mechanically processing the usable parts of the vascular system. The basic method of the invention includes the steps of mechanically pulling the viscera connected to the liver to pull the gall bladder away from the liver and mechanically cutting between the liver and the gall bladder to separate the liver from the viscera and the gall bladder. The method also includes the steps of mechanically stretching the connecting structure connecting the liver to the heart to pull the heart away from the liver and mechanically cutting the connecting structure between the liver and the heart to separate the liver from the heart. The method also includes the steps of moving the separated heart with attached connecting structure through a chute under the influence of gravity onto a pair of cleaning rolls and mechanically removing the connecting structure from the heart with the cleaning rolls. The method also includes conveying poultry along a prescribed conveying path with the viscera still attached to the poultry carcass; hanging the vascular package over a locating edge while the vascular package is still attached to the viscera so that the vascular package is on that side of the edge opposite the poultry carcass while the major portion of the poultry viscera is on the same side of the edge as the poultry carcass; pulling the viscera away from the locating edge by pressing down on the viscera between the locating edge and the poultry carcass until the viscera package is pulled up against the locating edge; orienting the vascular package while the vascular package is pulled against the locating edge and while the vascular package is still attached to the rest of the viscera; separating the heart from the vascular package while the vascular package is oriented with respect to the liver; and, while the vascular package is still pulled up against the locating edge, finally separating the vascular package from the viscera by cutting the viscera package along the locating edge. The apparatus of the invention is designed for use with an overhead conveyor used to transport poultry through the eviscerating section of the poultry plant with the carcass head lowermost. The apparatus of the invention includes generally a frame which mounts a shackle guide thereon to guide the shackles supporting the poultry carcasses by the legs thereof as the shackles pass by the apparatus, a locating conveyor moving synchronously with the overhead conveyor and defining the locating edges thereon, a feeding guide to support the vascular package and the connection between the viscera and the vascular package and feed same onto the locating conveyor, a liver positioning guide for pulling the liver up against the locating edge on the locating conveyor so that the gall bladder on the vascular package is located on that side of the locating edge opposite the liver, a heart orienting mechanism which locates the heart relative to the liver held up against the locating edge so that the connection between the heart and the liver can be engaged, a heart positioning guide which engages the connection between the heart and the liver to selectively position the heart, a heart cutoff mechanism located adjacent to the heart positioning guide to cut the heart from the liver, and a liver cutoff mechanism to cut along the locating edge to separate the liver from the rest of the viscera.

These and other features and advantages of the invention disclosed herein will become more apparent upon consideration of the following detailed description and accompanying drawings wherein like characters of reference designate corresponding parts through the various views and in which:

These figures and the following description disclose specific embodiments of the invention, however, it is to be understood that the inventive concept is not limited thereto since it can be embodied in other forms.

DETAILED DESCRIPTION OF ILLUSTRATIVE EMBODIMENTS

Figure 1:
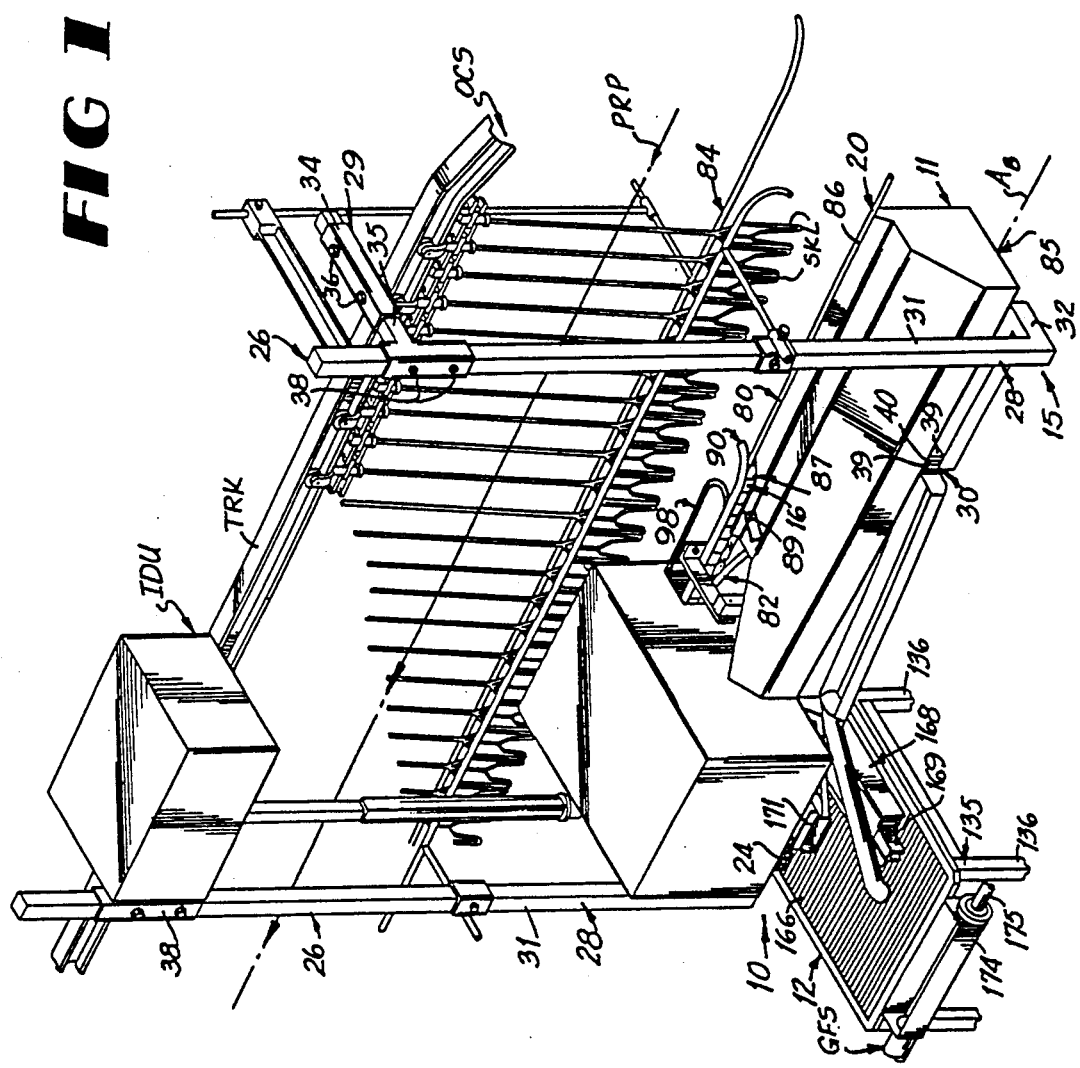
FIG. 1 is a perspective of the invention.

The invention is designed for use in the evisceration section of a poultry plant which is equipped with an overhead conveyor system OCS as seen in FIG. 1 that supports the poultry carcass PTC by its hocks HOK on shackles SKL and moves the birds BRD through the plant in a head lowermost position sequentially along a processing path PRP. The invention is located along the processing path PRP after the birds have been eviscerated and inspected but before gizzard processing. The viscera VSC is now hanging over the back of the poultry carcass PTC but still attached thereto as seen in FIG. 2.

Figure 2:
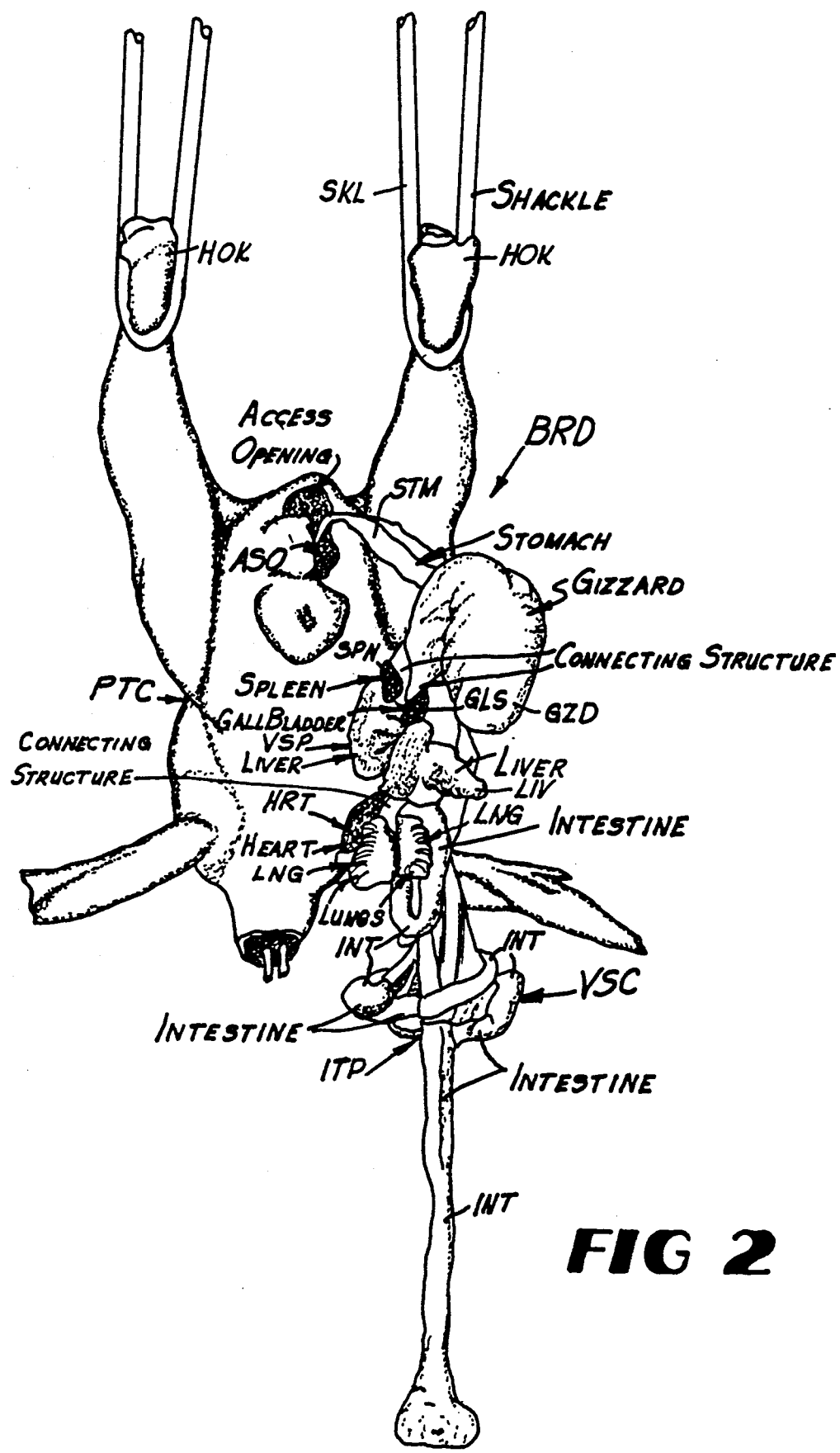
FIG. 2 is a perspective view illustrating the vascular package still attached to the viscera and after the poultry has been eviscerated.

The background of the invention can be best understood by reference to FIG. 2 which illustrates the viscera VSC dangling over the back of the poultry carcass PTC before separation and processing of the vascular package VSP. The poultry viscera generally includes the digestive system and the vascular system as well as the kidneys and reproductive organs. The viscera VSC removed in the evisceration process includes the digestive system, that portion of the vascular system located in the body cavity, the spleen SPN and the reproductive organs and is still attached to the poultry carcass PTC through the esophagus so that the stomach STM and gizzard GZD are located in the vicinity of the access opening ASO in the rear end of the body of the bird. The intestinal tract package ITP dangles from the gizzard GZD over the back of the poultry carcass PTC.

The vascular package VSP includes the liver LIV, heart HRT and lungs LNG as well as the connecting structure CNS (blood vessels and membranes) that connects these organs to each other. The connecting structure CNS also connects the vascular package VSP with the viscera VSC through the intestinal tract package ITP at a position spaced along the intestine INT from the intestinal outlet side of the gizzard GZD. Because the intestine INT is coiled up in the body cavity of the bird and held together by membranes, the vascular package VSP is located adjacent the gizzard GZD when the viscera is withdrawn from the body cavity as seen in FIG. 2. When the vascular package VSP is pulled away from the poultry carcass, a sufficient number of these membranes are broken to allow the intestine INT to uncoil and extend out to allow the vascular package VSP to be spaced away from the gizzard as best seen FIG. 13 but still be attached thereto through the intestine INT.

Figure 3:
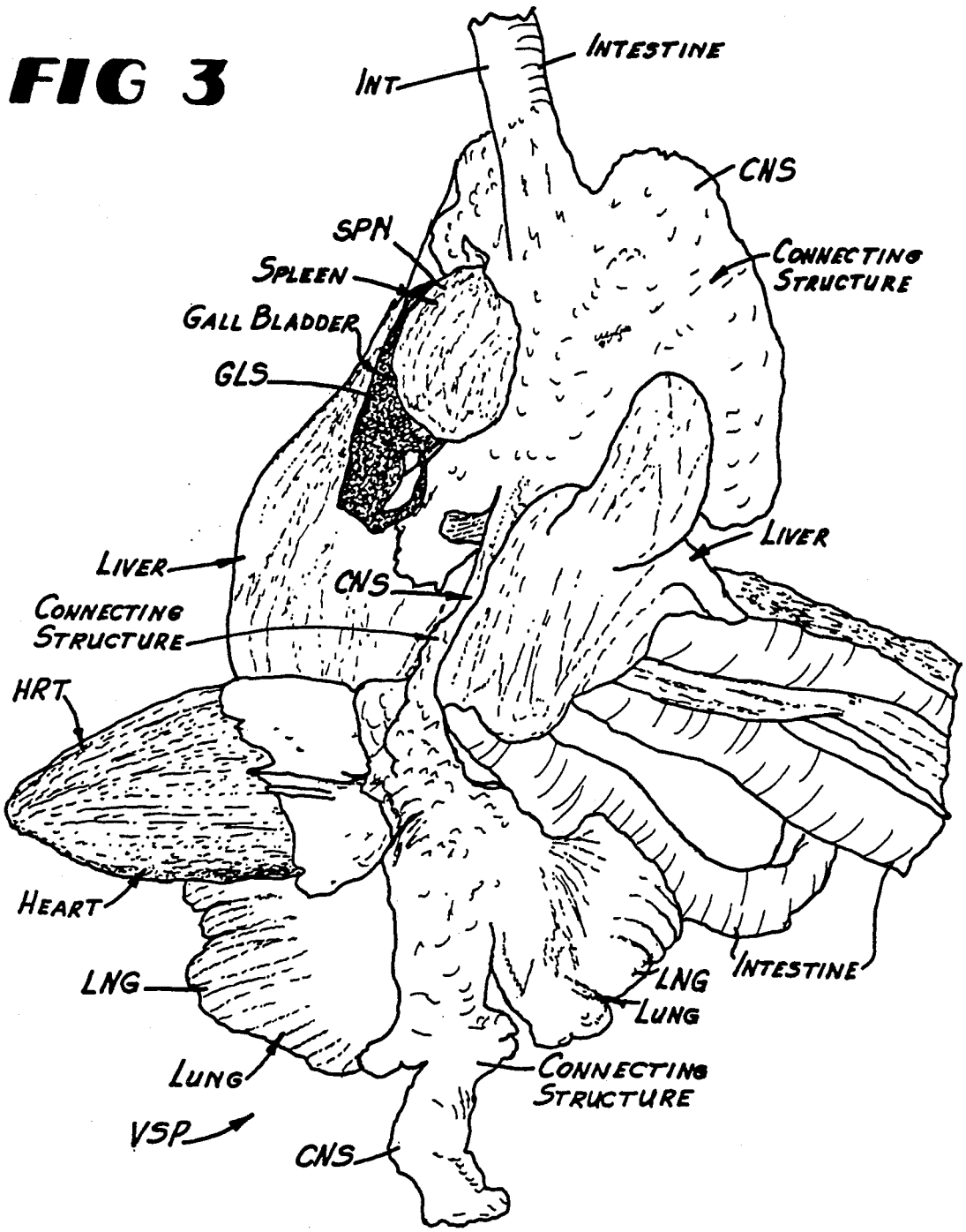
FIG. 3 is a perspective view of the vascular package after it has been stretched for separation from the rest of the viscera.

The gall bladder GLS is connected to the liver and the connecting structure CNS at that point where the liver is connected to the intestine INT as best seen in FIGS. 2 and 3 so that pulling the intestine INT away from the liver LIV serves to pull the gall bladder GLS and usually the spleen SPN away from the liver enough for the connecting structure CNS to be severed to separate the gall bladder GLS and spleen SPN from the liver along with the connecting structure CNS as will become more apparent.

The connecting structure CNS also connects the heart HRT to the liver LIV and the lungs LNG to the heart so that the heart and lungs dangle from the liver when the liver LIV is supported by the connecting structure CNS connecting the liver to the intestine INT as seen in FIGS. 2 and 3. This allows the connecting structure CNS to be engaged between the heart and liver to locate the heart and lungs with respect to the liver for removal of the heart and lungs from the liver as will become more apparent.

Separator Unit

Referring to FIG. 1, it will be seen that the heart and liver processor 10 incorporating the invention includes a separator unit 11 which separates the heart and liver from the viscera and from each other, and a giblet processing unit 12 receiving the separated heart and liver from the separator unit 11 and further processing the heart. The processed giblets are transported away from the processor 10 by a giblet flume system GFS typically available in poultry processing plants.

The separator unit 11 is typically suspended from the overhead track TRK of the overhead conveyor system OCS as seen in FIG. 1 while the giblet processing unit 12 is typically floor supported. The separator unit 11 is driven from the overhead conveyor system OCS through a conventional idler drive unit IDU which simplifies the synchronization of the separator unit 11 with the shackle movement on the overhead conveyor system OCS.

Figure 4:
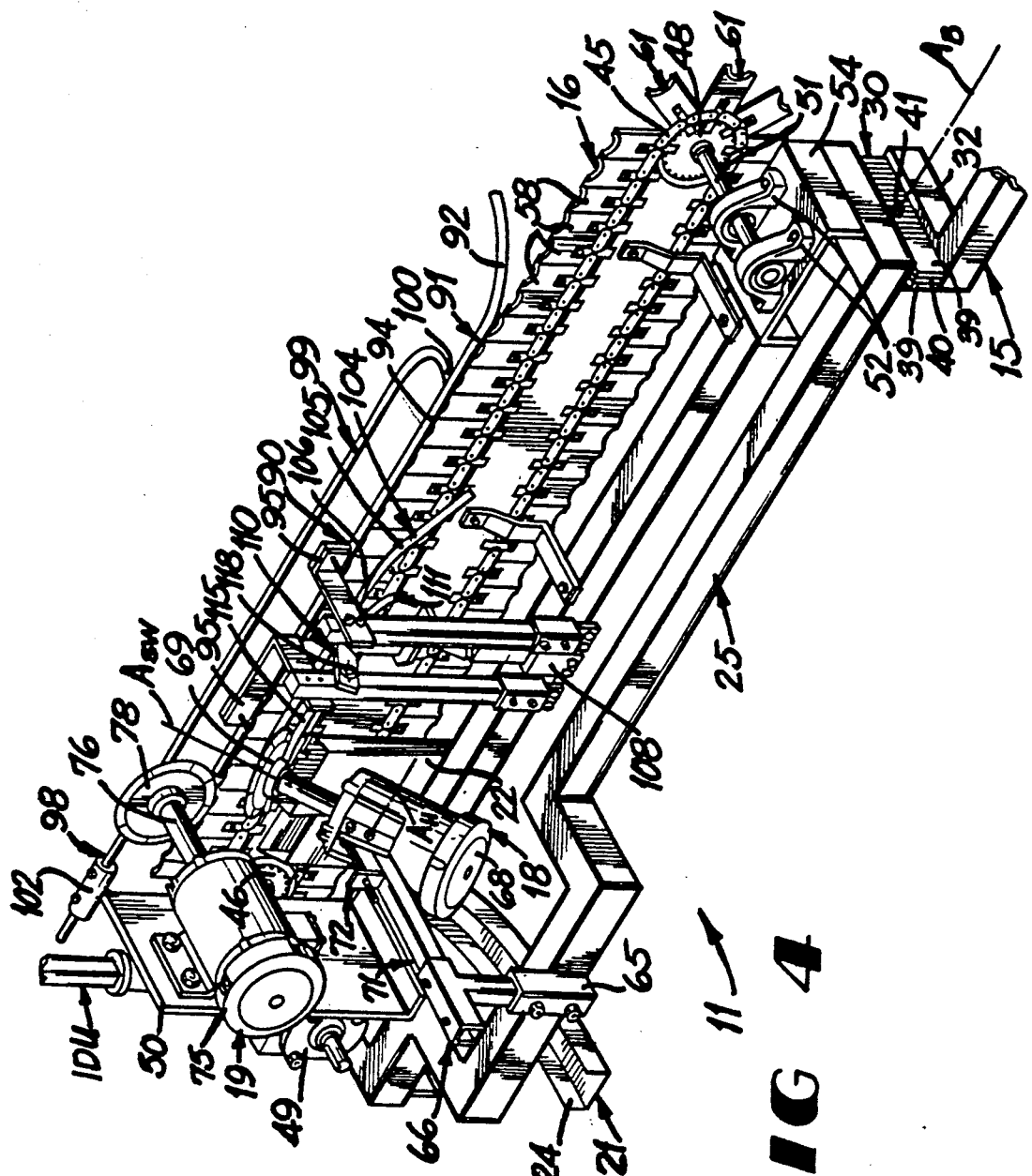
FIG. 4 is an enlarged perspective view of the separator unit with the covers removed to illustrate the interior thereof.

The separator unit 11 as seen in FIGS. 1 and 4 includes a support frame 15 which mounts a locating conveyor 16, a heart cutoff mechanism 18, and a liver cutoff mechanism 19 thereon. The frame 15 also mounts a guide system 20 to guide the vascular package through the unit as will become apparent and a chute assembly 21 for delivering the separated organs to the giblet processing unit 12 for further processing as will become more apparent.

The frame 15 includes a rectilinear base 25 seen in FIG. 4 which is suspended from the overhead conveyor track TRK by a pair of suspension assemblies 26 at the opposed ends of the base 25 as best seen in FIG. 1. The suspension assemblies 26 each include an L-shaped support 28 adjustably mounted at its upper end on the overhead track TRK by a track mounting mechanism 29 and adjustably mounting one end of the frame 15 thereon at its lower end by a base mounting mechanism 30. The L-shaped support 28 includes a generally vertical leg 31 and a generally horizontal leg 32 fixedly joined to the vertical leg 31 at its lower end. The track mounting mechanism 29 includes a square tube 34 mounted on the track TRK which slidably mounts a horizontal overhead support 35 therein held in place by lock bolts 36. The overhead support 35 mounts a vertical leg support tube 38 thereon that slidably receives the vertical leg 31 of the L-shaped support 28 therein with lock bolts 36 to hold the leg 31 in place vertically. Thus, the location of the separator unit 11 laterally of the vertical plane of the shackles SHK and the height thereof relative to the plant floor is adjusted by the track mounting mechanism 29.

The base mounting mechanism 30 includes a pair of vertical plates 39 mounted on top of the horizontal leg 32 on the L-shaped support 28 with a complementary plate 40 mounted on the underside of the end of the base 25. The plate 40 fits between the plates 39 and the plates 39 and 40 are provided with a set of aligned holes that receive a pivot pin 41 therethrough so that the base can pivot with respect to the suspension assemblies 26 about an axis $A_B$ oriented generally horizontal and parallel to the processing path PRP as best seen in FIG. 1. Tilt control bolts 42 may be provided to regulate the tilt angle of the base 25. Thus, tilt of the base 25 relative to the horizontal is controlled by the base mounting mechanisms 30.

The locating conveyor 16 as seen in FIG. 4 is mounted on the base 25 and lies in a generally vertical plane parallel to the base axis $A_B$. The locating conveyor 16 comprises an endless conveyor chain 45 trained around a drive sprocket 46 and a spaced apart driven sprocket 48. The drive sprocket 46 is mounted on the output shaft of a gearbox 49 mounted on an upstanding drive plate 50 on top of the base 25 adjacent the discharge end thereof. The driven sprocket 48 is mounted on an idler shaft 51 journalled in bearings 52 on the bearing mount 54 at the infeed end of the base 25 as best seen in FIG. 4. A chain guide 55 is mounted on the base 25 between the upper and lower flights of the chain 45 to maintain the upper flight of the chain 45 upright. It will be seen that the chain 45 operates generally vertical plane, however, the angle of the plane of the chain 45 with respect to the vertical can be varied by pivoting the base about the axis $A_B$ as will become more apparent.

Figure 7:
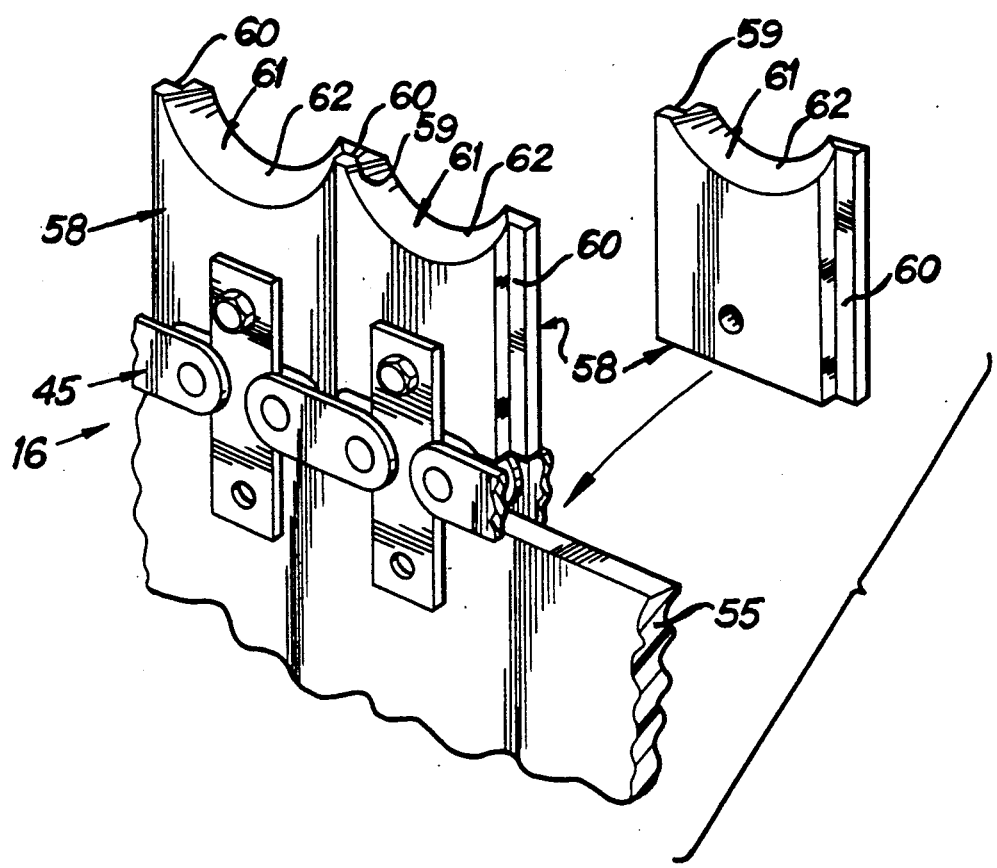
FIG. 7 is an enlarged exploded perspective view of the locating plates used in the invention.

To provide a locating edge against which the vascular package can be positioned for separation from the intestine INT, the chain 45 mounts a plurality of locating plates 58 thereon. The locating plates 58 are made out of plastic and are attached to the links of the chain 45 so that the plates 58 can pass around the sprockets 46 and 48. The plates 58 as best seen in FIG. 7 are provided with a leading offset 59 and a trailing offset 60 which are complementary mirror images of each other and the plates 58 are sized so that the leading and trailing edges on successive plates fit together to form a continuous strip as the plates 58 move along the upper flight of the chain 45 as best seen in FIG. 4. This prevents the viscera from falling down between the plates 58 while the vascular package VSP is being located as will become more apparent. The projecting end of each of the plates 58 is notched with a semi-circular notch 61 that is beveled along one side thereof to form a sharp arcuate locating edge 62 along the edge of the notch 61. The bevel forming the edge 62 faces away from the processing path PRP as will become more apparent.

Figure 5:
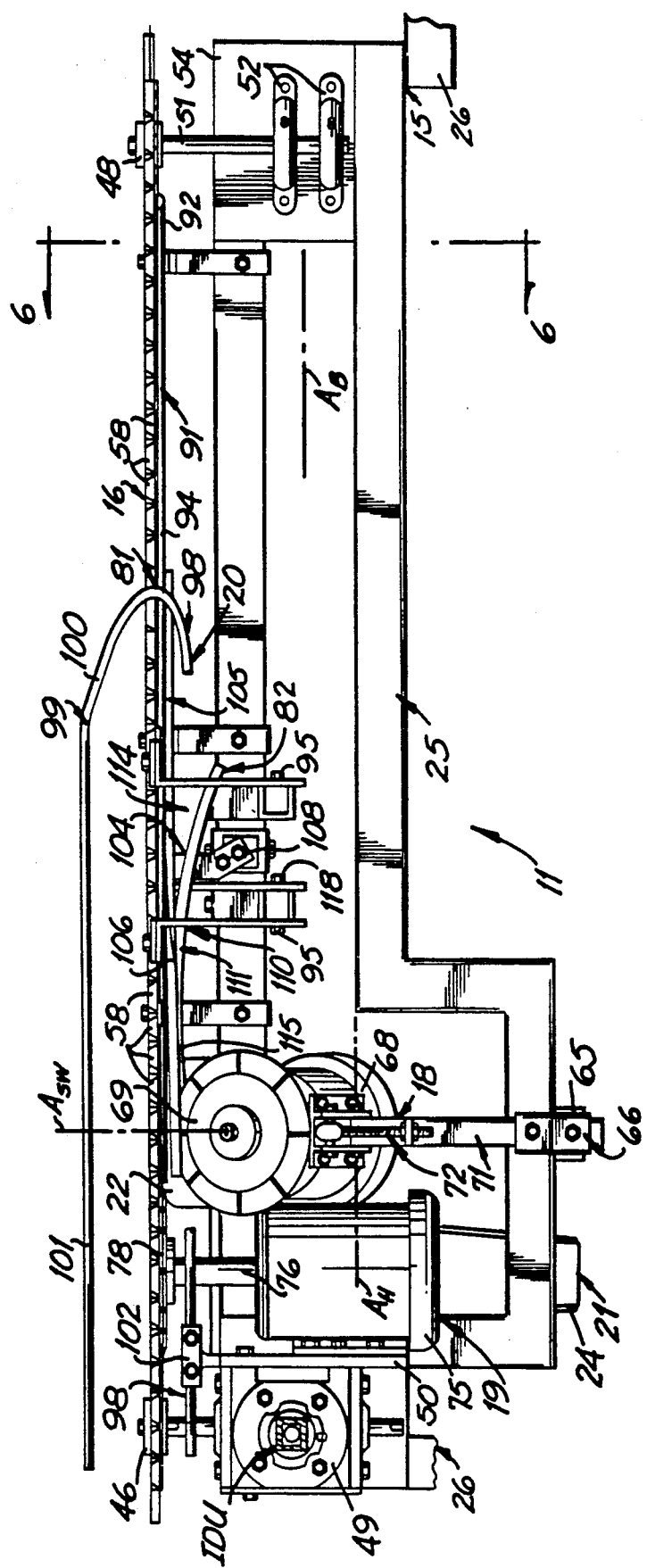
FIG. 5 is a top plan view of the separator with the covers removed.
Figure 6:
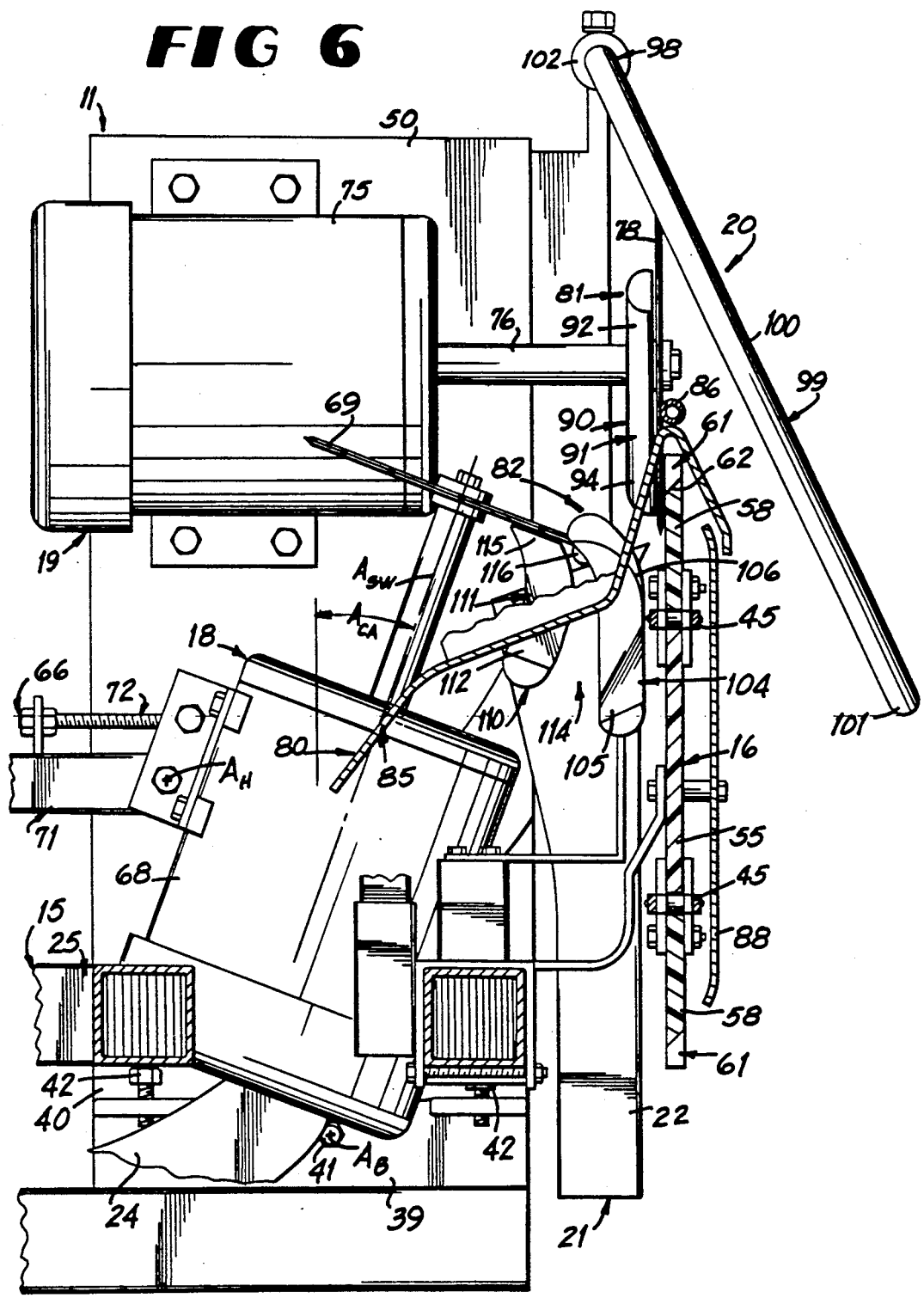
FIG. 6 is transverse cross-sectional view taken generally along line 6—6 in FIG. 5.

The heart cutoff mechanism 18 is mounted in a support tube 65 on the base 25 and projects toward the locating conveyor 16 as seen in FIGS. 4–6. The mechanism 18 includes a positioning assembly 66 vertically adjustably mounted in the tube 65, a drive motor 68 mounted on the positioning assembly 66, and a cutoff saw or knife 69 mounted on the output shaft of the motor 68.

The positioning assembly 66 has a horizontal adjustment mechanism 71 to locate the saw 69 toward and away from the conveyor 16 and a tilt mechanism 72 to tilt the shaft axis $A_{SW}$ of saw 69 about a horizontal axis $A_H$ parallel to the plane of the chain 45 to allow the saw 69 to be located adjacent the upper flight of the chain 45 to cut the heart and lungs from the liver as will become more apparent. When viewed in the vertical plane perpendicular to the plane of the conveyor 16, it will be seen that the shaft axis $A_{SW}$ usually defines an included angle $A_{CA}$ with the vertical of about 10°–20°.

The liver cutoff mechanism 19 includes a drive motor 75 adjustably mounted on the drive plate 50 on the base 25 with its output shaft 76 horizontally oriented and facing the conveyor 16. A cutoff saw or knife 78 is mounted on the shaft of motor 75. The conveyor 16 is adjusted so that the saw 78 passes immediately adjacent the locating edge 62 on that side of plates 58 facing away from the processing path PRP and the same side as the bevel forming the edge 62 as will become more apparent. The cutting edge on saw 76 passes below the locating edge 62 on the plates 58 to cut the connecting structure CNS between the liver and intestine.

The guide system 20 best seen FIGS. 1 and 4–6 includes an infeed guide assembly 80, a liver locator guide assembly 81, a heart positioning guide assembly 82, and a shackle guide assembly 84 as best seen in FIG. 4. The infeed guide assembly 80 serves to preposition the vascular package VSP for the locating conveyor 16 while the liver locator guide assembly 81 actually locates the liver on the locating conveyor 16 so that it can be removed by the liver cutoff mechanism 19. The heart positioning guide assembly 82 positions the heart HRT relative to the liver on the conveyor 16 so that the heart and lungs can be separated from the liver by the heart cutoff mechanism 18. The shackle guide assembly 84 serves to keep the shackles SHK in the processing path PRP while the vascular processing is taking place.

Figure 15:
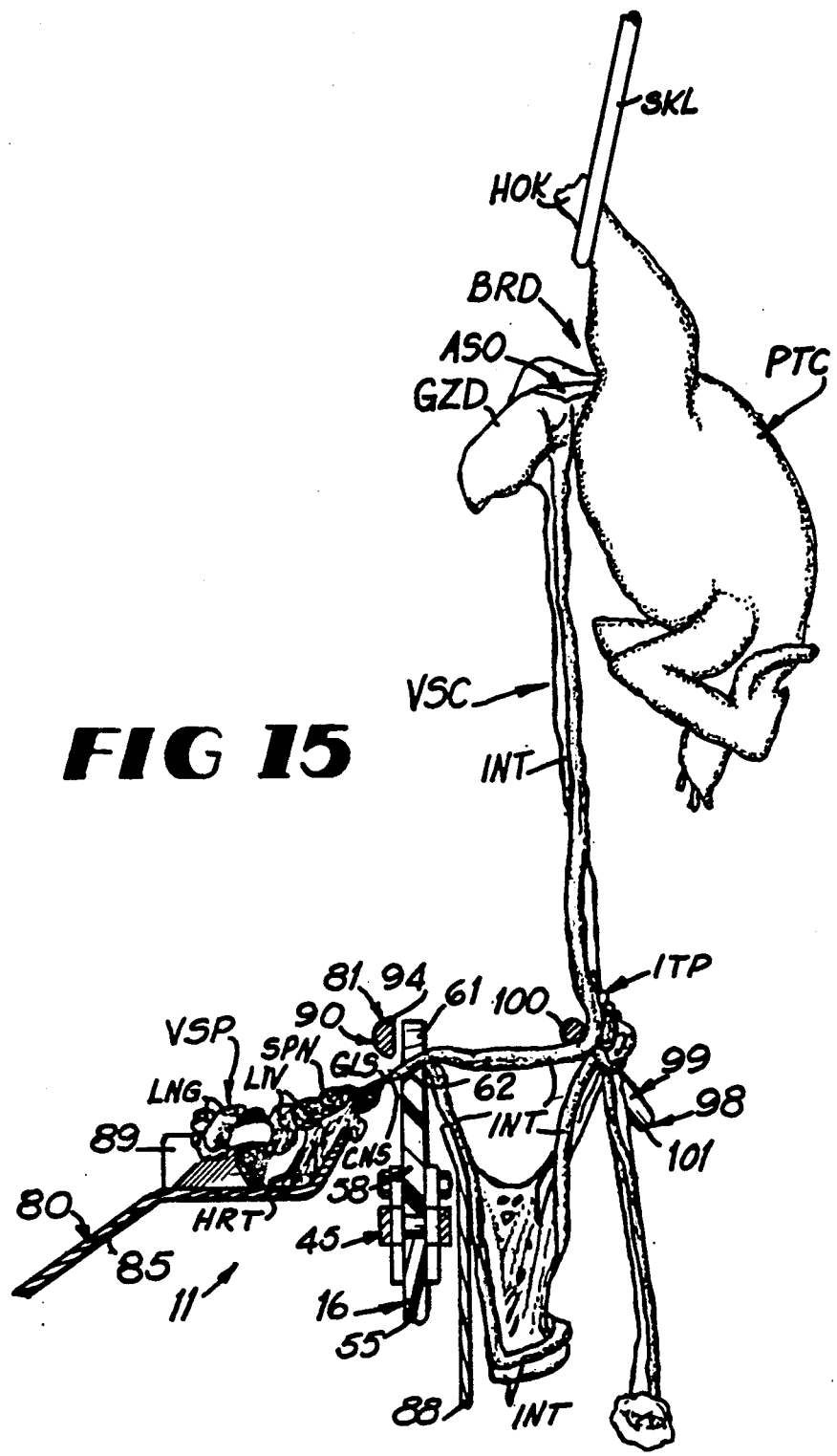
FIG. 15 is a view showing the shifting plate disentangling the heart and lungs from the liver.

The infeed guide assembly 80 includes a cover 85 which fits over the infeed end of the locating conveyor 16 and has a locating tube 86 in alignment over the infeed end of the upper flight of the conveyor 16. The tube 86 serves as a prelocator for the vascular package VSP when the operator pulls the vascular package away from the poultry carcass PTC to uncoil the intestine INT. The pulled vascular package VSP is laid onto the cover 85 on that side of the tube 86 which is opposite the processing path PRP so that the uncoiled intestine lays across the tube 86. The movement of the shackles SHK along the processing path PRP moves the vascular package VSP and the intestine INT along the tube 86 and the cover 85 as will become more apparent. The cover 85 keeps the vascular package VSP from dropping down into the separator unit 11 until it has moved over the locating conveyor 16. The infeed guide assembly 80 also includes a rear cover guard 88 to cover the opposite side of the conveyor 16 as best seen in FIG. 6. The cover 85 has a cutout 87 therein on that end facing the liver cutoff mechanism 19 as seen in FIG. 1 so that the intestine INT and the connecting structure CNS can drop down into the upwardly opening notches 61 in the locating plates 58 on the locating conveyor 16 while the vascular package VSP is still supported on the cover 85 as best seen in FIG. 15. An angled shifting plate 89 on the cover 85 adjacent the cutout 87 shifts the vascular package VSP so that the heart and lungs can become disentangled from the liver as will become more apparent.

The liver locator guide assembly 81 includes a hold down guide 90 with a hold down bar 91. The guide bar 91 includes an upwardly curved inlet portion 92 that extends from a position above the locating plates 58 on the conveyor 16 down to a position below the level of the upwardly opening notches 61 in the upwardly projecting ends of the plates 58 on the upper flight of the conveyor 16 and a substantially straight hold down portion 94 integral with the trailing end of the inlet portion 92 and extending toward the discharge end of the machine. The hold down portion 94 also lies below the level of the open end of notches 61 to keep the connecting structure CNS in the notches 61 as will become more apparent. The hold down bar 91 is located on that side of the plates 58 opposite the processing path PRP. The bar 91 serves to keep the liver LIV on that side of the plates 58 opposite the processing path PRP as will become more apparent. The hold down guide 90 includes an adjustable mounting 95 carried by the base 25 for adjustably positioning the guide bar 91 with respect to the upper flight of the locating conveyor 16 as will become apparent.

Figure 16:
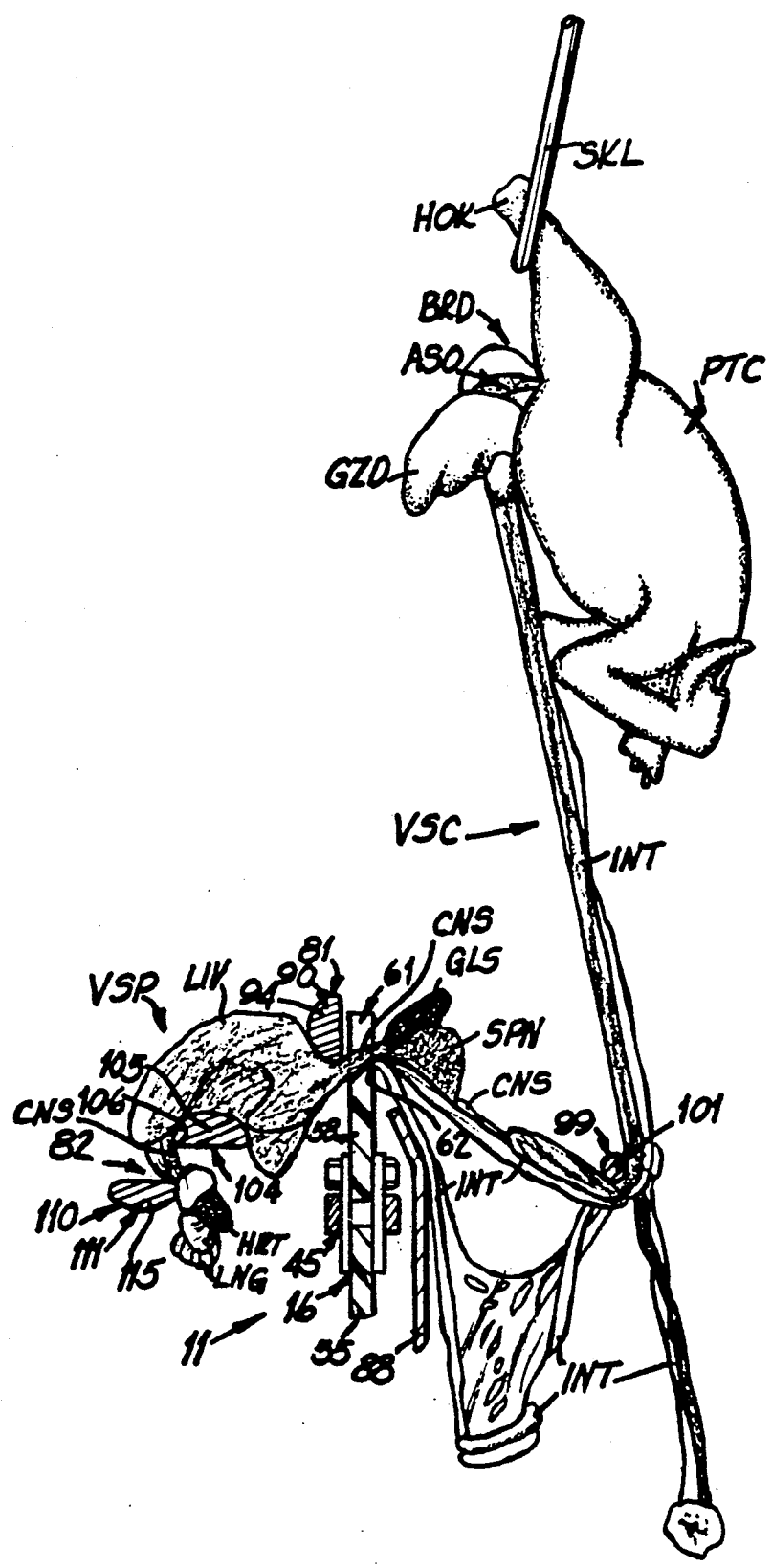
FIG. 16 is a view showing the stretching of the connecting structure to pull the gall bladder and spleen away from the liver in one direction and the heart and lungs away from the liver in the other direction.

The liver locator guide assembly 81 also includes a locating guide 98 with a guide bar 99 that engages the intestine INT between the liver and the gizzard to pull the liver back against the beveled side of the edge 62 on the locating conveyor 16 as best seen in FIG. 16. The guide bar 99 includes an upwardly curved stretching portion 100 which extends from a position above the level of the upper flight of the conveyor 16 to a position below the notches 61 in the plates 58 at its trailing end. Bar 99 also includes a substantially straight maintaining portion 101 joined to the trailing end of the stretching portion 100 and extending to the exit end of the machine as best seen in FIGS. 5 and 6. This locates the liver with respect to the edge 62 on the associated locating plate 58 and the bar 99 increases the tension on the connecting structure CNS so the gall bladder GLS is pulled over the edge 62 to locate the gall bladder on the opposite side of the locating edge 62 from the liver LIV. This allows the liver cutoff mechanism 19 to cut the gall bladder from the liver adjacent the discharge end of the conveyor 16 as will become more apparent. The guide bar 99 is adjustably positioned with respect to the upper flight of the locating conveyor 16 by an adjustable mounting 102 on the top of the drive plate 50 as best seen in FIG. 5.

Figure 17:
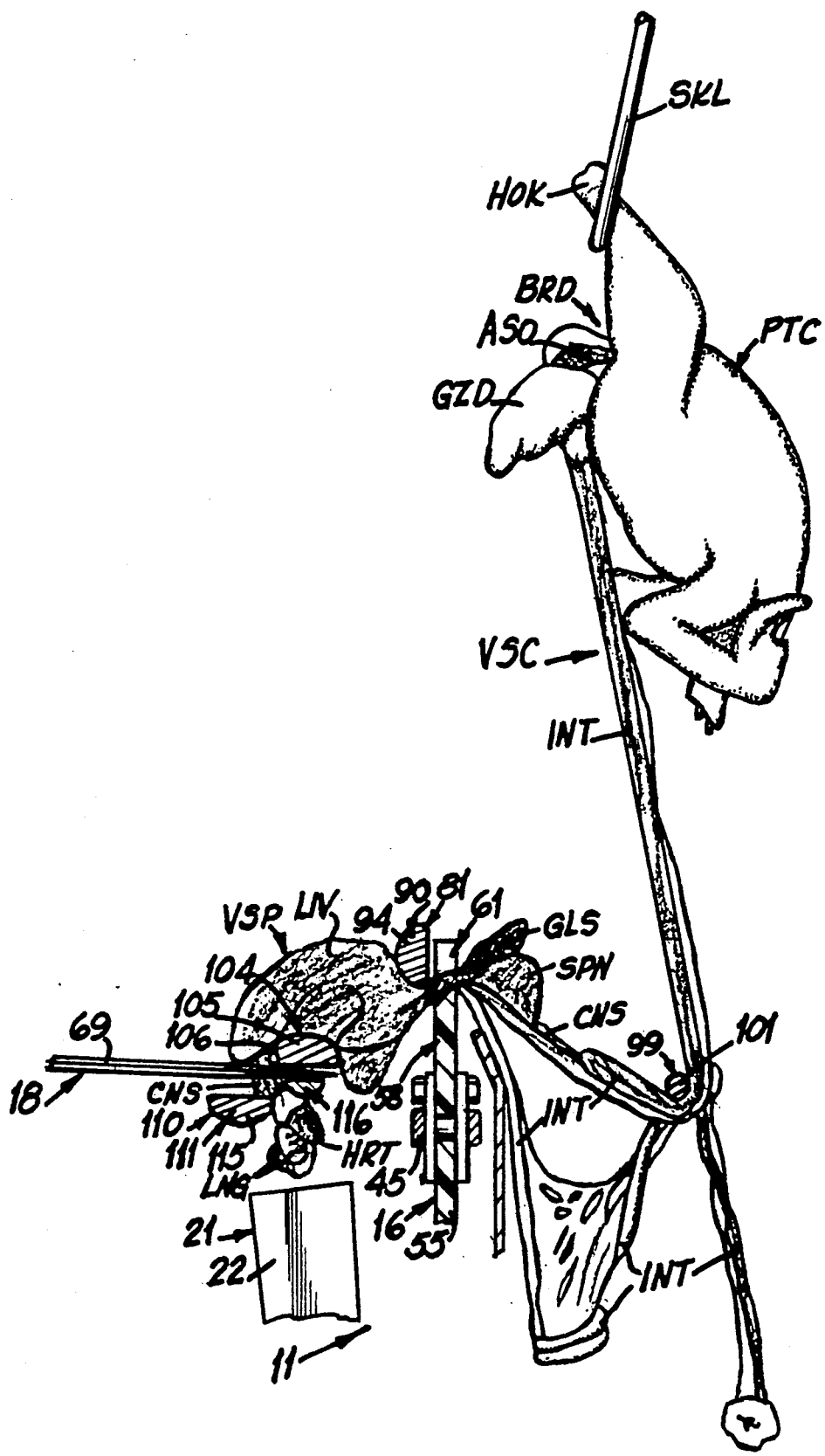
FIG. 17 is a view showing the cutting of the heart and lungs from the liver closely adjacent the liver so that the membranes and veins and arteries are left on the heart; and, FIG. 18 is a view showing the cutting of the liver from the viscera with the gall bladder staying with the viscera.

The heart positioning assembly 82 includes an upper guide 104 with an upper positioning bar 105 located on that side of the conveyor 16 opposite the processing path PRP and between the locating tube 86 on the cover 85 and the heart cutoff mechanism 18. The positioning bar 105 angles upwardly from a position below the level of the trailing end edge on the cover 85 to extend under the connecting structure CNS between the liver LIV and the heart HRT to a position about level with the bottom of the liver held by the locating edge 62 on the locating conveyor 16 and the guide 90 to finally pass over the saw 69 on the cutoff mechanism 18 as best seen in FIGS. 5 and 17. At the same time, the bar 105 angles away from the plane of the conveyor 18 as will become more apparent to stretch the connecting structure CNS between the heart and liver. The positioning bar 105 defines a secondary positioning edge 106 thereon over which the connecting structure CNS is stretched before being cut by the heart cutoff mechanism 18 as will become more apparent. The upper guide 104 includes an adjustable mounting 108 carried by the base 25 to adjustably mount the positioning bar 105 with respect to the conveyor 16.

The heart positioning assembly 82 also includes a lower guide 110 that cooperates with the upper guide 104 to position the heart for separation. The lower guide 110 includes an lower positioning bar 111 with an inlet section 112 that angles inwardly toward the upper positioning bar 105 to form a tapering throat 114 best seen in FIG. 5 into which the heart HRT passes as the vascular package VSP is moved along by the conveyor 16. The positioning bar 111 also has a trailing stretching section 115 oriented closely adjacent and parallel to the upper positioning bar 105 at the heart cutoff mechanism 18. The bar 111 cooperates with the bar 105 to stretch the connecting structure CNS over the secondary locating edge 106 between the heart and liver and to locate the connecting structure to be severed by the saw 69 cutting along the locating edge 106. The positioning bar 111 is mounted on base 25 through an adjustable mounting 118.

The trailing end of the upper positioning bar 105 also mounts a keeper 116 that extends immediately under the saw 69 as best seen FIG. 17 to keep the connecting structure CNS from becoming entangled in the saw 69 as it is being cut. Thus, when the connecting structure CNS is cut by the saw 69, the heart and lungs are separated from the liver.

Giblet Processing Unit

The giblet processing unit 12 best seen in FIGS. 1 and 8-11 includes a base frame 135 supported on the processing plant floor on adjustable legs 136 so that the height of the unit 12 can be adjusted to conform the requirements of the separator unit 11. The frame 135 defines an open top therein and mounts a drain therebelow so that unusable parts can be discharged therethrough into the offal disposal system of the processing plant.

A processing roll assembly 140 is mounted on the frame 135 for receiving the separated hearts, lungs and connecting structure and removing the lungs and connecting structure from the hearts as will become more apparent. The processing roll assembly 140 includes a subframe 141 mounted on the base frame 135, a discharge end bearing assembly 142 mounted on one end of the subframe 141, a drive end bearing assembly 144 mounted on the opposite end of the subframe 141, and a pair of processing rolls 145 and 146 rotatably mounted between the bearing assemblies 142 and 144.

Figure 9:
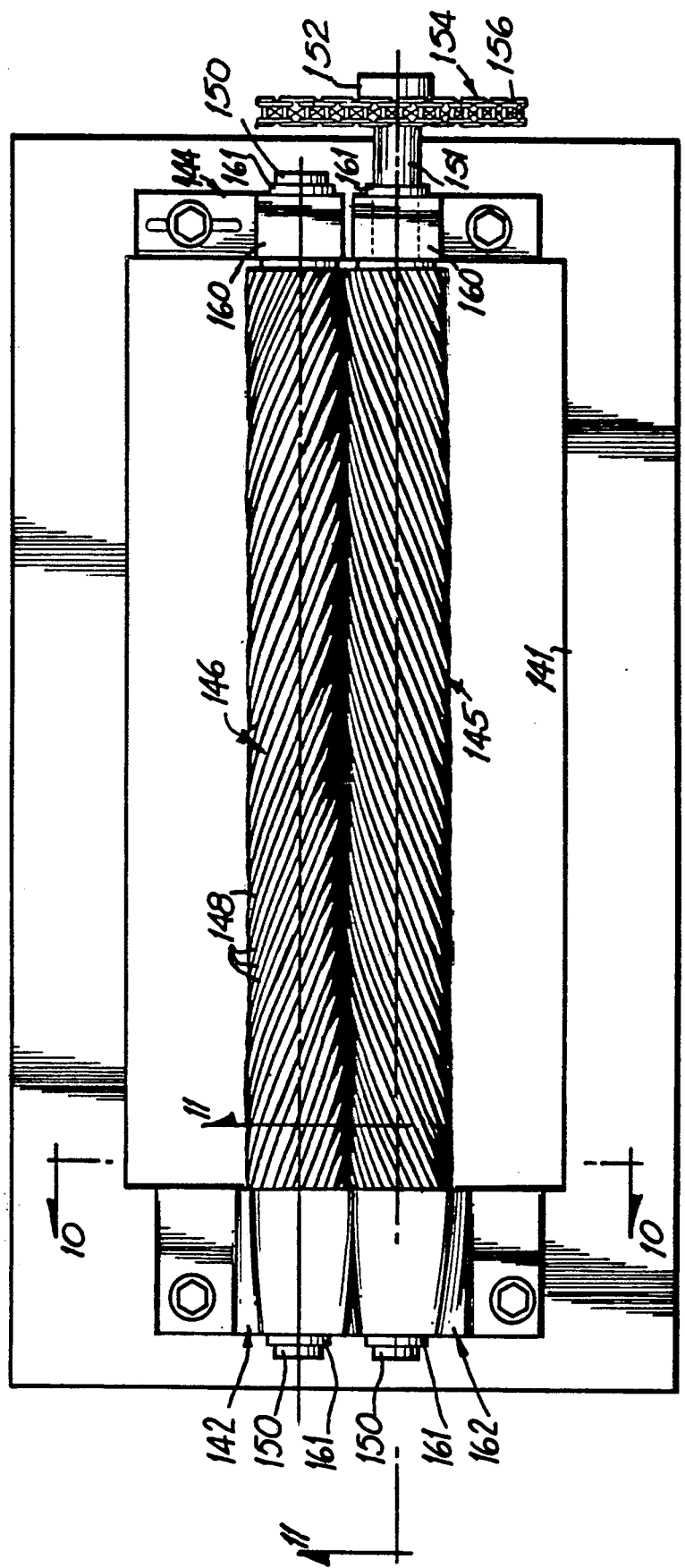
FIG. 9 is an top plan view of the cleaning rolls in the giblet processing unit.
Figure 10:
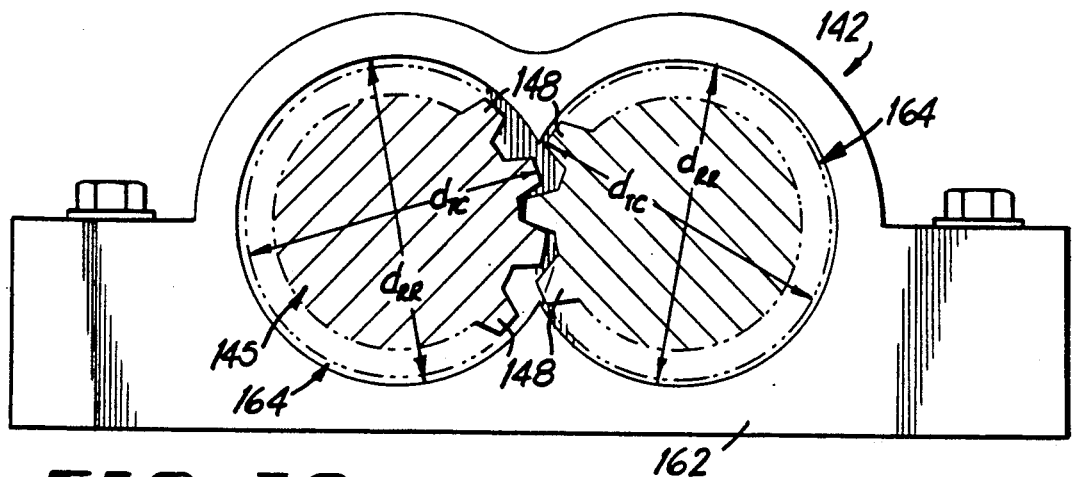
FIG. 10 is an enlarged cross-sectional view taken generally along line 10—10 in FIG. 9.
Figure 11:
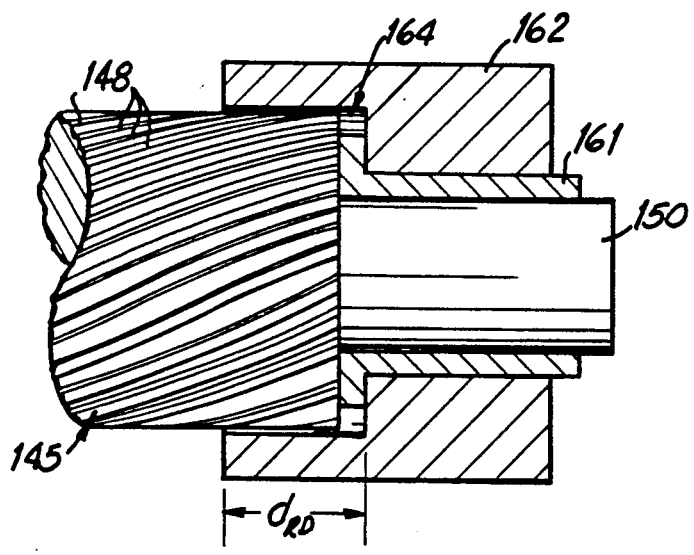
FIG. 11 is an enlarged cross-sectional view taken generally along line 11—11 in FIG. 9.

The processing rolls 145 and 146 have helically extending gear teeth 148 thereon which drivingly intermesh in a manner well known in the poultry processing art for cleaning rolls. The teeth 148 grip soft lungs LNG and connecting structure CNS still attached to the heart HRT and pull the lungs and connecting structure down between the rolls while the relatively firmer heart remains on top of the rolls 145 and 146. This serves to pull the lungs and connecting structure off of the heart and to cut the blood vessels passing out of the heart close enough to the heart to pass governmental inspection. The teeth 148 also serve to propel the heart lengthwise of the rolls toward the discharge end 149 of the rolls 145 and 146. The particular teeth 148 illustrated have a diametrical pitch of about 12 and a pressure angle of 14.5°, however, it is to be understood that other pitches and pressure angles may be used without departing from the inventive concept. The crest diameter $d_{TC}$ of the teeth 148 may be varied, however, a diameter of 1.5-2 inches has been found satisfactory to minimize damage to the heart HRT while still cleaning it. A diameter $d_{TC}$ of about 1.75 inches has been found to be particularly effective. The driving roll 145 has a stub shaft 150 on the discharge end thereof as best seen in FIG. 11 journalled in the discharge end bearing assembly 142 as will be explained. The opposite end of the driving roll 145 has a drive shaft extension 151 thereon that extends through the driving end bearing assembly 144 as best seen in FIG. 9 to mount the driven sprocket 152 of the chain and sprocket arrangement 154 thereon. The driven roll 146, on the other hand, has stub shafts 150 on both ends of the roll.

The drive end bearing assembly 144 is conventional with a pair of bearing blocks 160 which are adjustably positioned on the subframe 141 in known manner. The bearing blocks 160 each mount a bearing 161 therein to rotatably receive one of the shafts 150 or 151 therein. The spacing of the bearing blocks 160 is adjusted to insure that the teeth on the rolls 145 and 146 properly mesh.

The driven end bearing assembly 142 has a dual bearing block 162 that mounts a pair of the bearings 161 best seen in FIG. 11 therein at the proper spacing to maintain driving engagement of the roll teeth in combination with the drive end bearing assembly 144. The bearing block 162 defines a pair of recesses 164 therein in registration with the bearings 161 that open onto that side of the block 162 facing the rolls 145 and 146. The recesses 164 receive the teeth 148 on the ends of the rolls 145 and 146 therein. The recesses 164 have a diameter $d_{RR}$ sufficient to give a running clearance with the teeth 148 and a depth $d_{RD}$ sufficient for the ends of the teeth 148 to be covered by the bearing block 162. While different dimensions may be used, a diameter $d_{RR}$ about 0.025 inch larger than the teeth crest diameter $d_{TC}$ has been found satisfactory and a depth $d_{RD}$ of about 0.375 inch has been found satisfactory. It will be noted that the recesses 164 open into each other so that the teeth 148 on the rolls 145 and 146 can mesh. Thus, the bearing block 162 covers the ends of the teeth on the rolls 145 and 146 to prevent a build up of the material removed from the heart around the ends of the rolls that causes binding as was encountered in the prior art. It will be appreciated that the recesses 164 may be combined into a single recess that extends around both rolls.

In operation, it will be seen that the heart HRT with the connecting structure CNS and the lungs LNG attached are placed on the processing rolls 145 and 146 upstream of the discharge ends thereof. The rolls 145 and 146 are rotated so that the heart is driven toward the discharge ends of the rolls as it is being cleaned. The cleaned heart HRT is discharged over the discharge end bearing assembly 142. The open top of the frame 135 has a grating 166 over it to prevent the giblets (heart and liver) from falling into the drain. Thus, the cleaned heart is discharged off the processing roll assembly 140 onto the grating 166.

Figure 8:
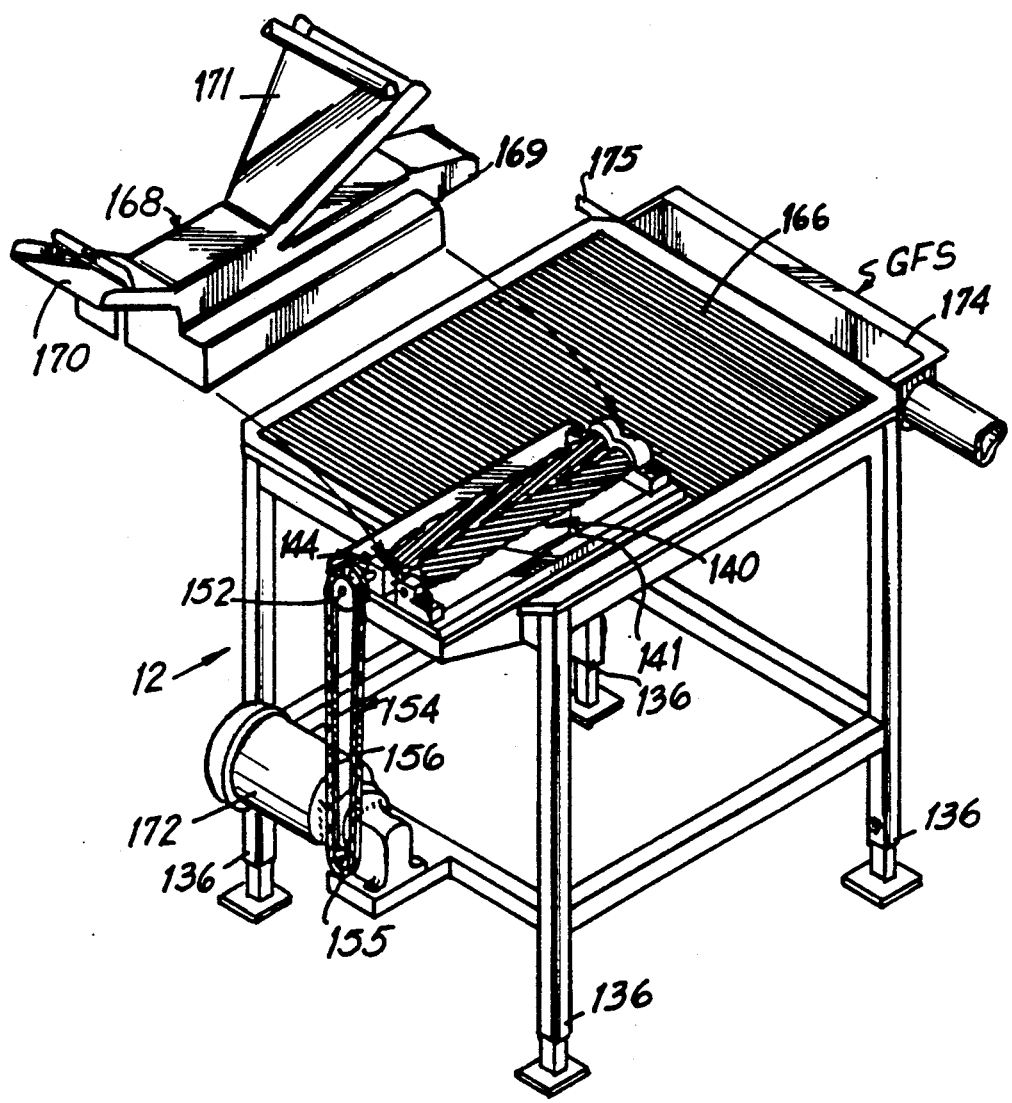
FIG. 8 is an exploded perspective view of the giblet processing unit of the invention to show the interior construction thereof.

To protect the worker and also to contain the water and other material that might be thrown by the rotating rolls 145 and 146, a roll cover 168 is provided as best seen in FIGS. 1 and 8. The roll cover 168 has a discharge chute 169 to direct the cleaned hearts onto the grating 166. The cover 166 also has a primary feed chute 170 which receives the separated hearts with attached lungs and connecting structure from the heart chute 22 of the chute assembly 21 on the separator unit 11 and directs them onto the processing rolls 145 and 146 adjacent the drive end thereof. A secondary feed chute 171 is also provided to allow the worker to reprocess any hearts which are not fully cleaned in the first pass through the processing roll assembly 140.

The rolls 145 and 146 are driven by a drive motor 172 mounted on the base frame 135 below the top thereof so as not to interfere with access to the grating 166. The output shaft of the motor 172 mounts the drive sprocket 155 of the chain and sprocket arrangement 154 and is connected to the driven sprocket 152 on the processing roll assembly 140 to drive the rolls 145 and 146.

The giblet flume system GFS includes a catch bin 174 mounted across the front of the base frame 135 as best seen in FIG. 1. Water is supplied to the flume system GFS through the supply pipe 175 also seen in FIG. 1.

The separated livers LIV are delivered to the grating 166 via the liver chute 24 under the cutoff saw 78 on the liver cutoff mechanism 19. It will be noted that the livers are not passed through the processing roll assembly 140.

OPERATION

Figure 12:
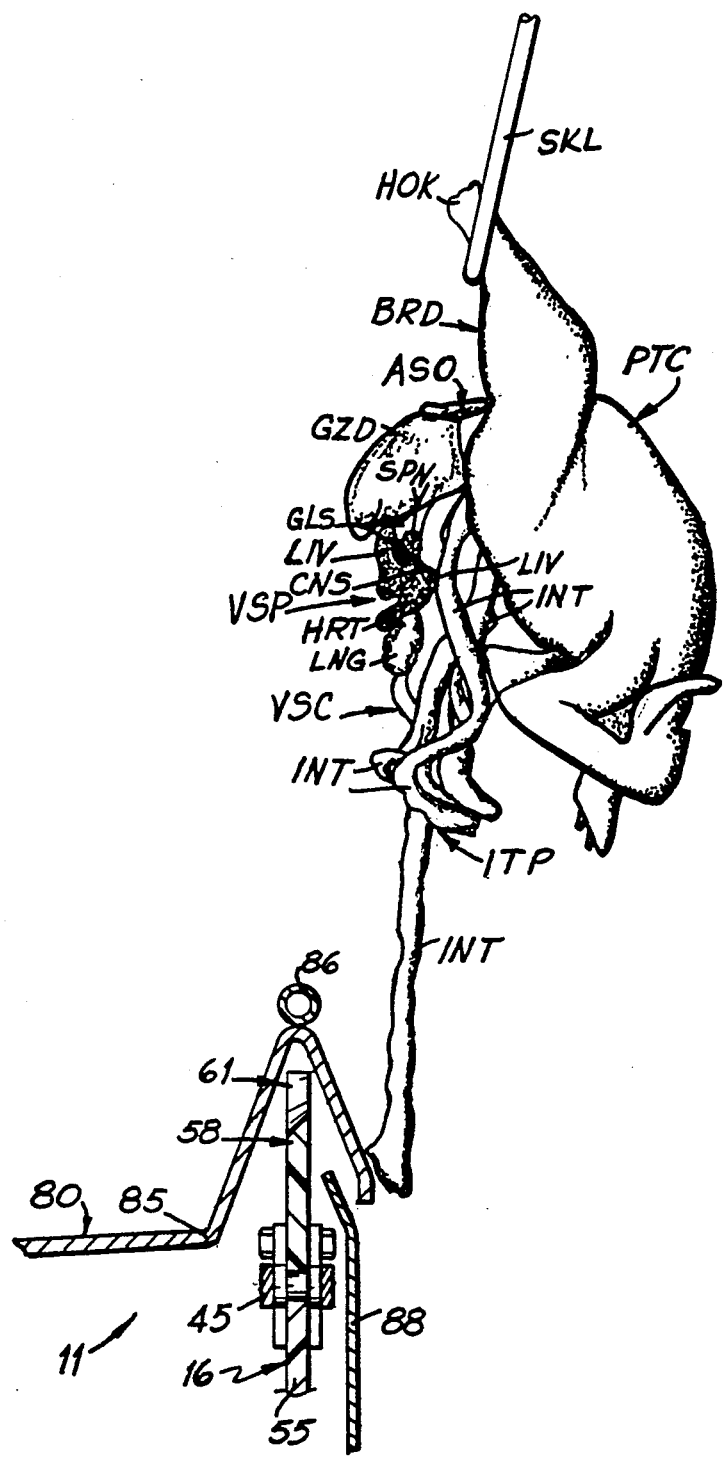
FIG. 12 is a view showing the bird ready for processing with the viscera hanging over the back of the carcass.

The operation of the invention will be better understood by consideration of FIGS. 12–18. The incoming birds BRD are supported in a headlowermost position on the conveyor by the shackles SKL as seen in FIG. 12. The birds have been eviscerated and the viscera VSC is hanging over the back of the poultry carcass PTC. As seen in FIG. 12, the bird BRD is transported close enough to the separator unit 11 for the operator to manually grasp the vascular package VSP.

Figure 13:
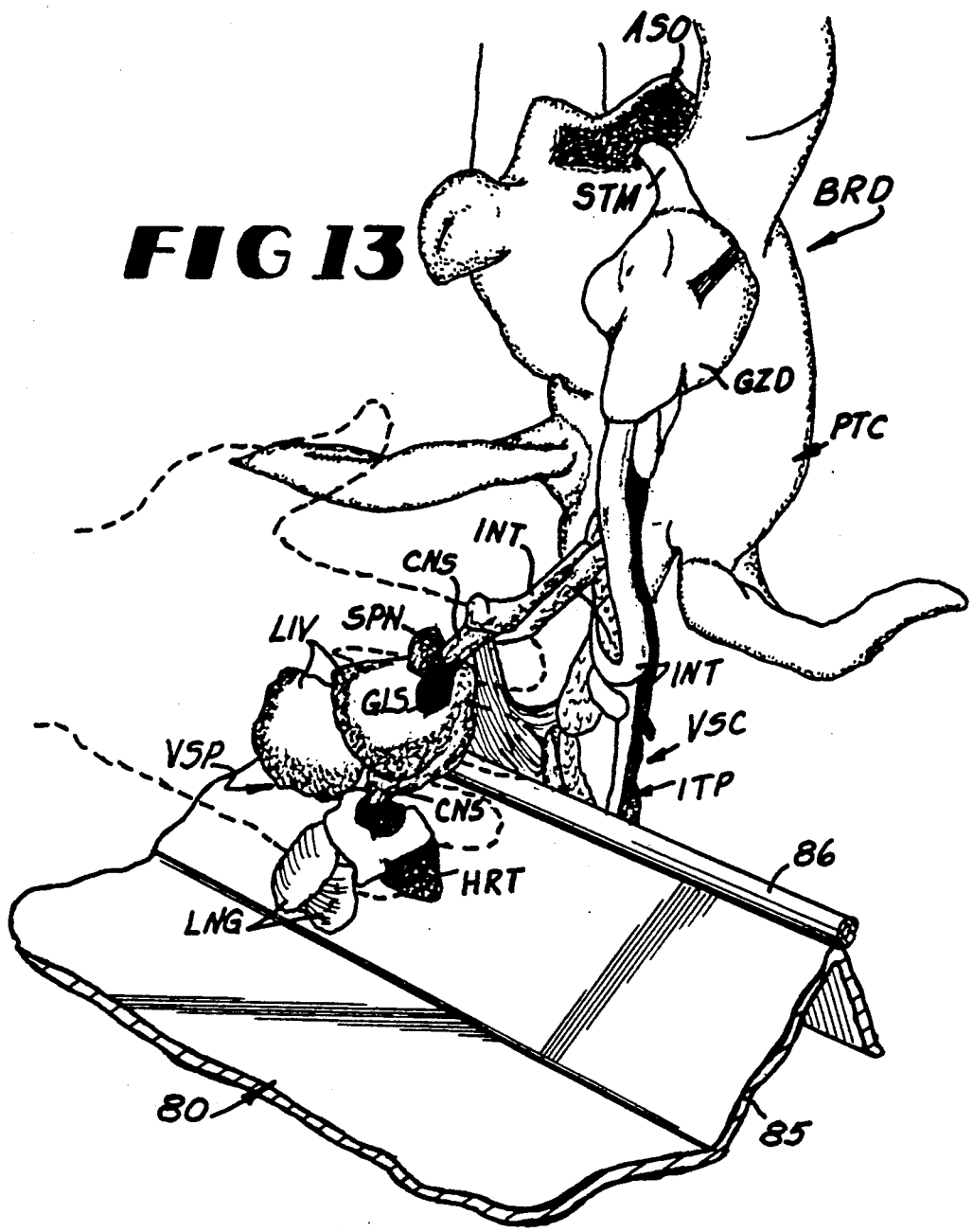
FIG. 13 is a view showing manually pulling the vascular package to extend the intestinal package.

The operator manually grasps the vascular package VSP and pulls the package out over the machine as seen in FIG. 13. The operator's hand is shown in dashed lines and is shown open so that the vascular package can be viewed. It will be appreciated that the operator grasps the vascular package to pull it away from the poultry carcass PTC. The fact that the intestine INT is bound together by various membranes and other structure allows the intestine INT to be extended as seen in FIG. 13 so that the vascular package VSP can be pulled over the locating tube 86 on the cover 85 for processing. Actually, the operator pulls the vascular package VSP sufficiently far away from the poultry carcass PTC for there to be some slack in the intestine INT still connected to the poultry carcass PTC.

Figure 14:
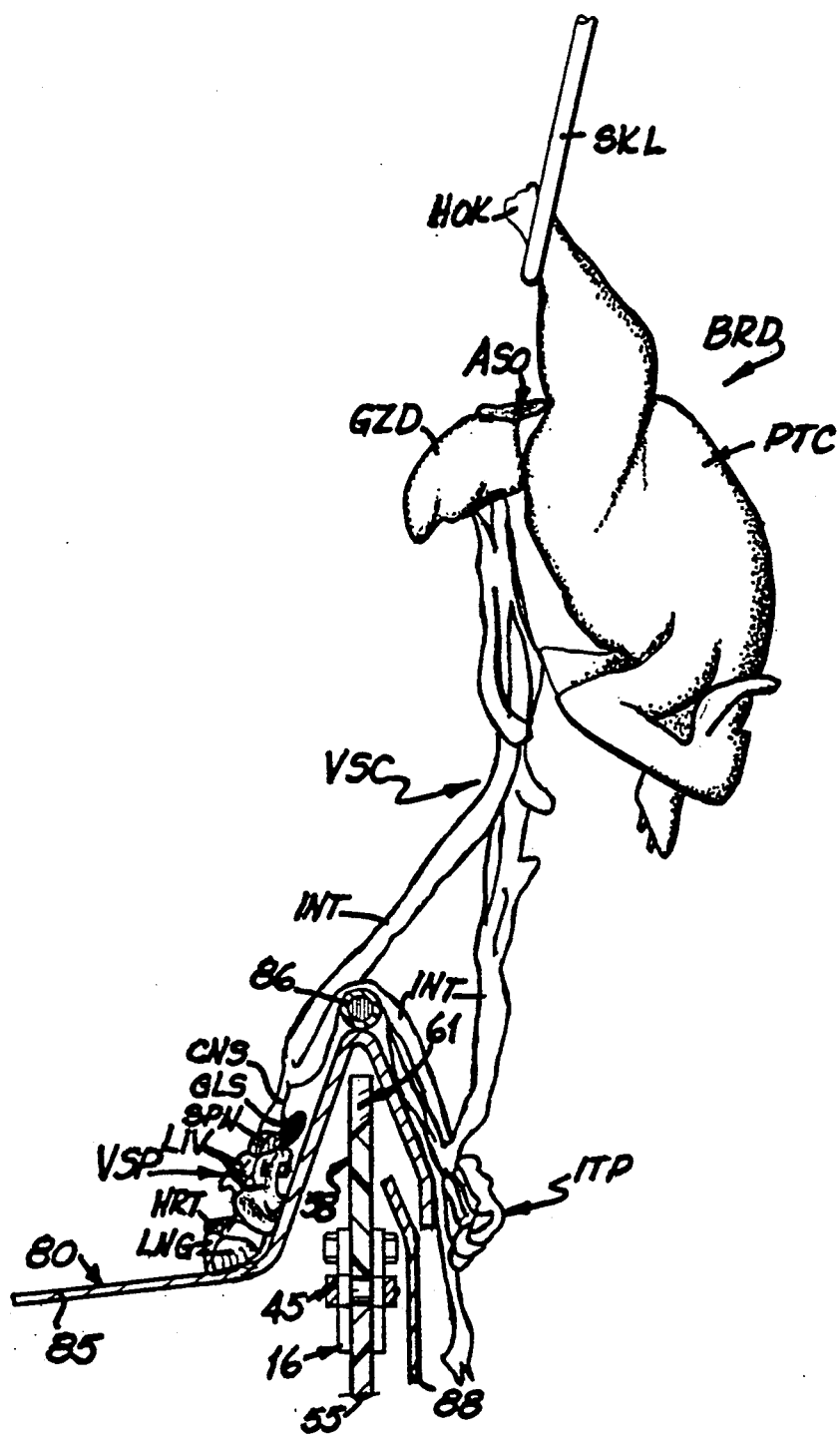
FIG. 14 is a view showing the vascular package placed over the locating tube on the infeed guide.

FIG. 14 shows the bird after the vascular package VSP has been laid on top of the cover 85 with the intestine INT extending over the locating tube 86. After this point, the harvesting operation is automatic. The movement of the bird BRD along processing path PRP pulls the intestine INT and thus the vascular package VSP along the cover 85. This serves two purposes, the first being that the operator can quickly pull down the vascular packages VSP onto the cover 85 without having to worry about synchronization and, secondly, this pulling operation tends to stretch out the vascular package with the heart and lungs trailing the liver.

FIG. 15 shows the bird BRD after the intestine has dropped off the end of the locating tube 86 and into one of the notches 61 in top of the locating plate 58 on the locating conveyor 16. At this point, it will be appreciated that the chain 45 on the locating conveyor 16 is moving synchronously with the movement of the bird BRD on the conveyor system OCS. By the time the bird reaches a position seen in FIG. 15, the intestine INT has passed under the end portion 92 of the hold down bar 91 so that the hold down portion 94 keeps the intestinal connection between the vascular package VP and the poultry carcass PTC within the notch 61. At the same time, the stretching portion 100 of the guide bar 99 has engaged the intestine INT connected to the vascular package VSP and has started to pull it through the notch 61 so as to pull the vascular package VSP toward the locating plate 58. Also at this time, the shifting plate 89 is engaged by the vascular package VSP which lifts the vascular package VSP and then allows it to drop over the shifting plate 89 so that the heart HRT and lungs LNG are allowed to disentangle from the liver LIV and fall down below the liver LIV. As the overhead conveyor system OCS and the locating conveyor 16 continue to move the bird and vascular package VSP along the processing path, the stretching portion 100 on the guide bar 99 continues to pull the vascular package VSP toward the locating plate 58. The hold down portion 94 on the hold bar 91 arrests the movement of the liver LIV toward the plate 58 while the gall bladder GLS and spleen SPN continue to move through the notch 61 so that the connecting structure CNS connecting the spleen and gall bladder to the liver is stretched over locating edge 62 to maintain a separation between the spleen and gall bladder and the liver LIV. This is best seen in FIG. 16.

At the same time, the connecting structure CNS between the gall bladder and spleen and the liver is being stretched, the upper positioning bar 105 passes up under the vascular package VSP between the liver and the heart and lungs so that the secondary locating edge 106 on the positioning bar 105 engages the connecting structure CNS connecting the liver to the heart and lungs. The connecting structure CNS between the heart and lungs and the liver passes down throat 114 between the upper positioning bar 105 and the inlet section 112 on the lower positioning bar 111. This causes the connecting structure CNS to be stretched around the secondary locating edge 106 on the upper positioning bar 105 as seen in FIG. 16. The vascular package VSP is now ready for further processing.

FIG. 17 shows the heart and lungs being separated from the liver LIV by the saw 69 on the heart cut off mechanism 18. The saw 69 cuts through the stretched connecting structure CNS between the liver LIV and the heart HRT and lungs LNG. The separated heart and lungs drop into the heart chute 22 to be discharged into the giblet processing roll assembly 140 where the lungs and connecting structure are cleaned from the heart HRT.

Figure 18:
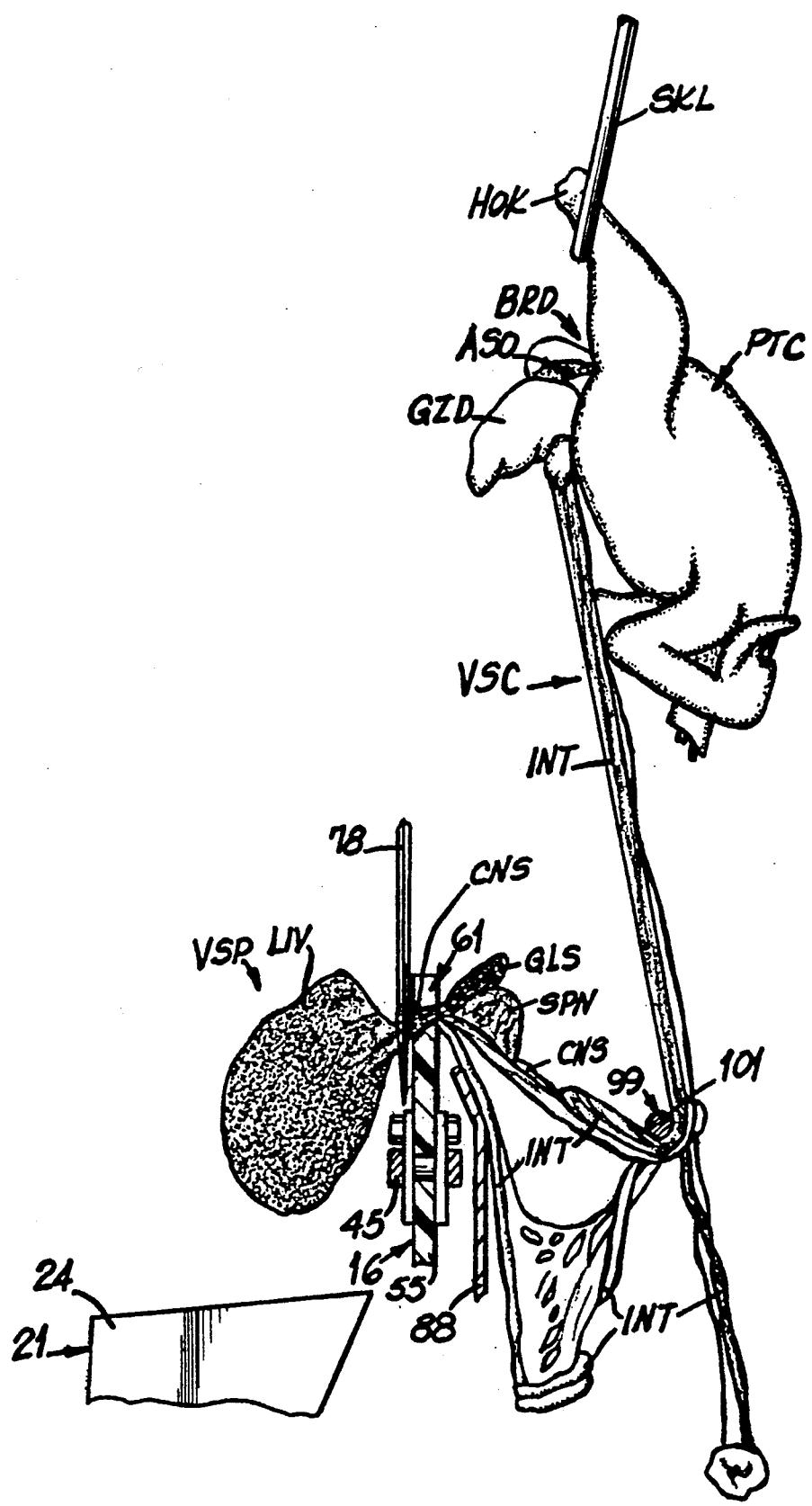

After the liver passes the saw blade 69, it drops down to the position seen in FIG. 18 and continues to move along the processing path by the overhead conveyor system OCS and the locating conveyor 16. Just as the stretched connecting structure CNS between the liver and the gall bladder and spleen passes out from under the hold down portion 94 of the hold down bar 91, the saw 78 on the liver cut off mechanism 19 cuts through the stretched connecting structure CNS adjacent the locating plate 58 and on that side opposite the poultry carcass PTC as seen in FIG. 18. This separates the liver LIV from the rest of the viscera and the liver drops down into the chute 24 for delivery onto the grating 166 on the giblet processing unit 12.

What is claimed as invention is:

1. A method of removing the vascular package from the rest of the poultry viscera comprising the steps of:
   a) conveying poultry along a prescribed conveying path with the viscera still attached to the poultry carcass;
   b) hanging the vascular package over a locating edge while the vascular package is still attached to the rest of the viscera so that the vascular package is on that side of the locating edge opposite the poultry carcass while the major portion of the poultry viscera is on the same side of the edge as the poultry carcass;
   c) pulling the viscera away from the locating edge by pressing down on the viscera between the locating edge and the poultry carcass until the vascular package is pulled up against the locating edge;
   d) while the vascular package is still pulled up against the locating edge, separating the vascular package from the viscera by cutting the viscera along the locating edge; and,
   e) moving the locating edge synchronously with the movement of the poultry carcasses along the prescribed conveying path.

2. The method of claim 1 wherein the heart and liver in the vascular package are removed,
   wherein step c) includes pulling the liver up against the locating edge;
   wherein step d) includes separating the liver from the rest of the viscera by cutting along the locating edge;
   and further comprising the steps of:
   f) pulling the heart away from the liver; and
   g) cutting the vascular package between the heart and liver to separate the heart from the liver.

3. A machine for removing the liver from poultry viscera including the gall bladder where the liver is connected to the viscera through connecting structure comprising:
   A) liver positioning means mechanically pulling the viscera connected to the liver to pull the gall bladder away from the liver, said liver positioning means including:
      A1) locating conveyor means defining a locating edge thereon, said locating conveyor means comprises:
         A1a) an endless flexible member;
         A1b) frame means;
         A1c) a pair of spaced apart mounting members rotatably mounted on said frame means and mounting said endless flexible member therebetween, said endless flexible member defining a locating flight between said mounting members; and,
         A1d) a plurality of locating members mounted on said endless flexible member and defining said locating edge thereon along said locating flight;
      A2) liver guide means for stretching the connecting structure between the liver and the rest of the viscera over said locating edge on said locating conveyor means with the liver located closely adjacent one side said locating edge and the gall bladder located on the opposite side of said locating edge; and,
   B) liver cutoff means mechanically cutting between the liver and the gall bladder pulled by said liver positioning means to separate the liver from the viscera and the gall bladder, wherein said liver cutoff means includes:
      B1) a cutoff blade located adjacent said locating edge for cutting the connecting structure stretched over said locating edge to separate the gall bladder and the rest of the viscera from the liver.

4. The machine of claim 3 wherein said plurality of locating members each define an upwardly opening cutout therein to receive the viscera and defining said locating edge therealong so that a plurality of locating edges are defined along the locating flight on said endless flexible member, each of said locating members defining opposed side edges thereon configured to overlap the edges of adjacent locating members to form a substantially continuous section along the locating flight to prevent the viscera from falling between said locating members.

5. The machine of claim 4 wherein said liver guide means further includes:
- A2a) a first guide bar assembly including an upwardly curved inlet portion and a substantially straight hold down portion positioned adjacent the locating flight of said locating conveyor so that said inlet portion extends from an upper position above said cutouts in said locating members on the locating flight of said locating conveyor to a lower position below the upwardly opening end of said cutouts to hold the viscera in said cutout and so that said hold down portion extends from the lower end of said inlet portion along the locating flight of said locating conveyor to maintain the viscera in said cutout and for preventing the liver from passing over said locating edge while permitting the gall bladder to pass thereover.

6. The machine of claim 5 wherein said liver guide means further includes:
- A2b) a second guide bar assembly including an upwardly curved stretching portion and a substantially straight maintaining portion positioned on the opposite side of the locating flight of said locating conveyor from said first guide bar assembly so that said stretching portion extends from an upper position above said cutouts in said locating members on the locating flight of said locating conveyor to a lower position below said cutouts to stretch the viscera in said cutout until said gall bladder is pulled away from the liver and lies on the side of said locating edge opposite the liver and so that said maintaining portion extends from the lower end of said stretching portion along the locating flight of said locating conveyor to maintain the viscera in said cutout stretched and the gall bladder located opposite the liver.

7. The machine of claim 6 further including primary guide mounting means adjustably mounting said first and second guide bar assemblies for adjusting the positions of said guide bar assemblies with respect to said locating conveyor means.

8. A machine for removing the liver from poultry viscera including the gall bladder and for removing the heart from the liver comprising:
- A) liver positioning means mechanically pulling the viscera connected to the liver to pull the gall bladder away from the liver;
- B) liver cutoff means mechanically cutting between the liver and the gall bladder pulled by said liver positioning means to separate the liver from the viscera and the gall bladder;
- C) heart positioning means for mechanically stretching the connecting structure connecting the liver to the heart to pull the heart away from the liver wherein said heart positioning means includes:
  - C1) an upper heart guide bar assembly operatively associated with said locating conveyor means and said liver positioning means and defining a secondary locating edge thereon to engage the connecting structure between the heart and the liver as the liver is positioned by said locating conveyor means and said liver positioning means; and,
  - C2) a lower heart guide bar assembly operatively associated with said upper heart guide bar assembly for engaging the connecting structure between the heart and liver and stretching the connecting structure over said secondary locating edge; and
  - C3) secondary guide mounting means adjustably mounting said upper and lower heart guide bar assemblies for adjusting the positions of said heart guide bar assemblies with respect to said locating conveyor means and with each other; and,
- D) heart cutoff means for mechanically cutting the connecting structure between the liver and the heart to separate the liver from the heart.

9. The machine of claim 8 wherein said heart cutoff means includes:
- D1) a cutoff blade located adjacent said secondary locating edge for cutting the connecting structure between the heart and liver stretched over said secondary locating edge to separate the heart from the liver.

10. The machine of claim 9 further including:
- E) giblet processing means operatively associated with said heart cutoff means for receiving the heart cut off by said heart cutoff means and mechanically cleaning the heart.

11. The machine of claim 10 wherein said giblet processing means further includes:
- E1) toothed processing rolls adapted to grip the connecting structure still attached to the heart and pull the connecting structure off of the heart; and,
- E2) chute means for directing the heart cut off by said heart cutoff means onto said toothed processing rolls.

12. The machine of claim 11 wherein said processing rolls each has opposite toothed ends thereon, one end of which is the discharge end, and wherein said giblet processing means further includes:
- E3) mounting means for rotatably mounting said processing rolls thereon, said mounting means defining a recess therein for each discharge end of said processing rolls, said recess having a size such that the discharge end of said processing roll is rotatably received therein and a depth such that the teeth on the discharge end of said processing roll extend a prescribed distance into said recess.

13. The machine of claim 12 wherein each of said processing rolls defines teeth thereon with 12 pitch and a 14.5° pressure angle.

14. The machine of claim 13 wherein each of said processing rolls has a diameter of about 1.75 inches.

15. The machine of claim 14 wherein the teeth on said processing roll project into said recess in said mounting means about 0.35 inch.

* * * * *